Figure 1:
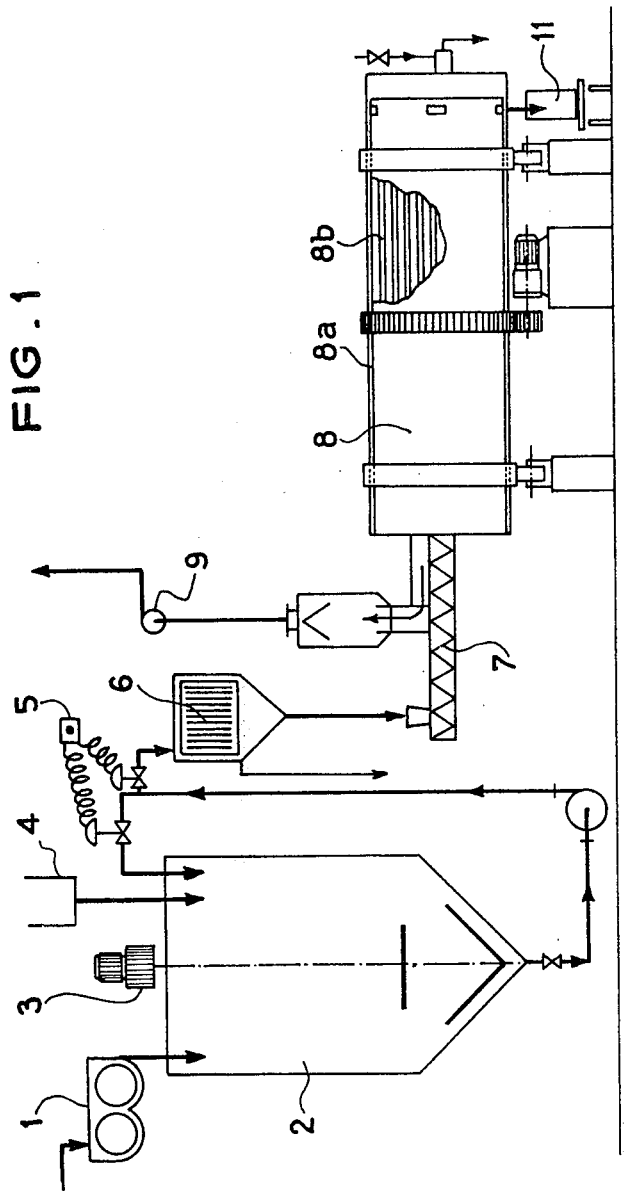

United States Patent [19]
Rat et al.

[11] 3,948,675
[45] Apr. 6, 1976

[54] PRODUCTION OF PARTICULATE PLASTICISED NITROCELLULOSE

[75] Inventors: Roger Maurice Rat, Saint-Medard-en-Jalles; Francois Ange Pollozec; Jacques Plazanet, both of Bergerac, all of France

[73] Assignee: Societe Nationale des Poudres et Explosifs, France

[22] Filed: July 30, 1973

[21] Appl. No.: 383,791

[30] Foreign Application Priority Data
Aug. 1, 1972  France .............................. 72.27745

[52] U.S. Cl. ................................. 106/195; 106/198
[51] Int. Cl.² ........................................... C08L 1/18
[58] Field of Search ............. 106/198, 195; 260/223

[56] References Cited
UNITED STATES PATENTS

| | | | |
|---|---|---|---|
| 2,116,536 | 5/1938 | McKee | 106/198 |
| 2,292,469 | 8/1942 | Olsen | 260/223 |
| 2,389,940 | 11/1945 | Speicher | 106/198 |
| 2,510,834 | 6/1950 | Phillips | 106/195 |
| 3,824,108 | 7/1974 | Stoetzer | 106/195 |

Primary Examiner—Theodore Morris
Attorney, Agent, or Firm—Bucknam and Archer

[57] ABSTRACT

A process for the production of plasticised nitrocellulose in the form designated "semi-chips", comprises impregnating nitrocellulose flock while the latter is present in a stirred suspension in water, separating the plasticised nitrocellulose obtained from the suspension, and drying at a temperature not exceeding 60° C.

The novel nitrocellulose "semi-chips" and the novel apparatus to carry out the invention are also described.

9 Claims, 2 Drawing Figures

PRODUCTION OF PARTICULATE PLASTICISED NITROCELLULOSE

This invention is concerned with the production of a particulate form of plasticised nitrocellulose.

Nitrocellulose is conventionally made in the form of chips or granules. Chips are manufactured from nitrocellulose flock which is moistened with water or dehydrated with alcohol, and which is mixed, for example in a Werner mixer, with a plasticiser. On hot calendering, a completely plasticised nitrocellulose which is compacted in the form of flakes or chips, is obtained, the calendering serving to remove the alcohol and the water. The products are compact, but residual traces of solvents are often found therein.

On the other hand, granules are manufactured from an aqueous dispersion of nitrocellulose flock in a mixture of water and ethyl acetate which also contains a plasticiser and a protective colloid. Dispersion of the collodion thus formed into fine droplets causes granulation. The solvent is removed by distillation and the protective colloid is removed by washing with water.

These projects have the disadvantage of frequently being very fine and it is difficult to remove the protective colloid, which is generally carboxymethyl-cellulose, completely when using nitro-celluloses having a high degree of polymerisation, it is also quite common to obtain turbide solutions during use.

We have now developed a novel form of particulate plasticised nitrocellulose which we will refer to as semi-chips.

According to the present invention, we provide a process for the production of particulate plasticised nitrocellulose, which comprises impregnating nitrocellulose flock while the latter is present in a stirred suspension in water, with a gelatinising plasticiser separating the plasticised nitrocellulose obtained from the suspension, and drying it at a temperature not exceeding 60° C.

The product obtained consists of nitrocellulose fibres which have been gelatinised by the plasticiser and do not contain any solvent. The drying step of the process causes agglomeration of the plasticised fibres to form friable grains or semi-chips, intermediate betwen chips and granules.

Granulation during the drying step enables very fine dusts to collect on the grains.

In addition to the fact that it does not contain any residual solvent, the main advantage of the product according to the invention is that it is much less compact than the conventional nitrocellulose chips and granules and does not contain fine dust. The solutions produced from semi-chips are clear at the time of use, in contrast to what is observed with certain types of granules of high viscosity.

The main advantage of the process according to the invention is that it is much simpler than the conventional processes leading to chips and granules. In particular, it avoids having to remove an alcohol or intermediate solvent.

The plasticizers used according to the present invention for the production of particulate plasticised nitrocellulose are mainly gelatinising plasticisers comprising dibutyl phthalate and dioctyl phthalate. However, the use of solid or lightly gelatinising plasticisers is also possible provided that an additional gelatinising solvent is added. Gelatinisation is obtained by the swelling of nitrocellulose fibers achieved by the additional solvent, thus permitting the penetration of the plasticiser. The possible heterogeneity of the amount of plasticiser in the fiber can be eliminated by first dispersing the plasticiser and the cotton in a mixer working by throwing and swirling prior to its admission in the tank for the manufacture of semi-chips.

The moisture content of the final product can be as low as 0.1%, which is very advantageous when the nitrocellulose product is to be used in polyurethane lacquers.

The semi-chips have a very marked advantage over chips and granules as far as the rate of dissolution in concerned, the time required for dissolution being roughly halved, for example, a 10% solution can be obtained in ¼ hour as compared with ½ hour for granules.

The ease of conversion into a paste with pigments is also greater than that observed with the conventional products. The semi-chips become less charged with static electricity than do the granules, because of the absence of dust. The stability is equivalent to that observed with the granules.

The apparent specific gravity of the semi-chips is low and is normally from about 0.13 to about 0.34 (as against 0.5 to 0.6 for the granules).

Figure 2:
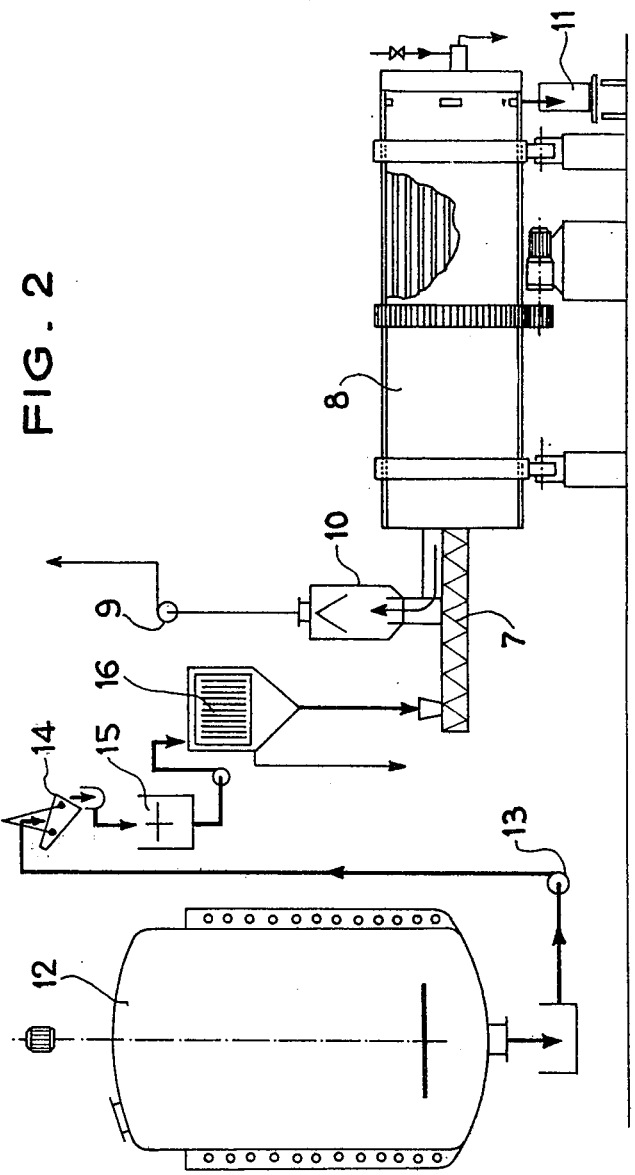

In order that the invention may be more fully understood, the following examples are given by way of illustration. In these examples, reference is made to the accompanying drawings, in which:

FIG. 1 is a diagrammatic elevation, partly in section, of an installation for the manufacture of semi-chips in a tank, and FIG. 2 is a diagrammatic elevation, partly in section, of an installation for the manufacture of semi-chips in a granulator.

EXAMPLE 1

Nitrocellulose flock, type CA.4, was swelled and gauged in a twin kneader 1 and was then introduced together with water into a cylindrical-conical tank 2 which was stirred by a variable speed motor-driven stirrer 3. Simultaneously plasticiser, supplied by a reservoir 4, was sprayed over the entire surface of the liquid in the tank.

Agitation of the mixture in the tank was continued for about 6 hours.

When the plasticisation was complete, the suspended plasticised nitrocellulose was passed by a pump to a reciprocating drainer 6 via an output control device 5. The product was drained in the drainer 6 to a moisture content of 40% and was then introduced via a metering feed screw 7 into a dryer 8 and was dried to less than 1;% moisture content in 40 minutes.

The dryer comprised a very slightly inclined (slope of 2.5°) revolving cylinder 8a having internal, concentrically arranged, tubes 8b extending over the entire length of the cylinder. The tubes 8b were supplied with saturated steam through a revolving double joint. The tubes 8b were firmly fixed to the cylinder by longitudinal and radial flat plates which also acted as scoops for lifting up the product and forcing the latter to roll over the tubes and to fall down loosely in the gentle stream of air.

The evaporation fumes were extracted in countercurrent to the product by a blower 9. A pressure release chamber 10 made it possible to stop nitrocellulose from being carried along in the exhaust stream.

The dried product was discharged from the dryer 8 into a packing case 11, and was weighed and removed to the store for finished products.

By way of example, the temperature of the saturated steam was from 120° to 135°C.

The temperature at which the product entered the dryer was ambient temperature; the temperature of the product at the outlet of the dryer did not exceed 60°C for a product dried to a moisture content of about 1%. This temperature was a function of the final dryness and of the rate at which the product was passed through the dryer.

The rate of rotation of the dryer was 8 revolutions/minute and the dwell time of the product inside the dryer was 40 minutes.

The product issued from the dryer without a marked change in its appearance as compared with the drained product introduced into the dryer. The product at the inlet to the dryer was agglomerated by moisture; at the outlet of the dryer it was loose and divided. Depending on the starting materials (nitrocellulose and plasticiser), there were large differences in appearance. Products dried to a moisture content of 1% passed through a 3 mm mesh sieve. Material which did not pass through consisted of agglomerates which crumbled easily.

The quality of the granulation depended on the origin of the initial cellulose and on the viscosity of the nitrocellulose. It was best with nitrocellulose made from linters and with low viscosities. With nitro-celluloses of high viscosities, the product which was obtained, had an appearance similar to short and light cotton floss, in the form of a fluff.

EXAMPLE 2

Nitrocellulose flock, type CA.4, which had previously been weighed, was introduced with a given amount of water into an apparatus of the Grignard type, having a double jacket 12 through which hot water was passed. The plasticiser was then introduced into the apparatus gradually, with stirring, and the suspended nitrocellulose was heated at a temperature of 40° to 50°C in order to improve the dispersion of the plasticiser.

After stirring for a period of 5 hours, the product was passed by a pump 13 to a screening apparatus 14, after which it was stored in a reservoir 15 from which it was supplied to a centrifugal drainer 16. The drained product was then dried and packaged under the same conditions as described above in Example 1.

We claim:
1. A process for the production of particulate plasticised nitrocellulose, which comprises the steps of:
   i. forming a suspension of nitrocellulose flock in water,
   ii. adding a gelatinising plasticiser to said suspension while stirring the latter, whereby said nitrocellulose becomes impregnated with said plasticiser,
   iii. separating the plasticised nitrocellulose obtained from the suspension, and
   iv. drying the separated plasticised nitrocellulose at a temperature of up to 60°C.

2. A process according to claim 1, wherein said plasticiser is selected from the group consisting of dibutyl phthalate and dioctyl phthalate.

3. A process according to claim 1 wherein the plasticiser is used in admixture with a gelatinising solvent of the nitrocellulose.

4. A process according to claim 1, wherein the amount of said plasticiser is from about 10 % to about 30 % by weight based on said nitrocellulose.

5. A process according to claim 1, wherein step (ii) is carried out for about 5 to about 6 hours.

6. A process according to claim 1, wherein the suspension is maintained at a temperature of from about 40° to about 50° C during step (ii).

7. A process according to claim 1, wherein in step (iii) the separated nitrocellulose is drained to a moisture content of about 40 % and in step (iv) is dried to a mixture content of about 1 %.

8. The particulate plasticised nitrocellulose obtained by the process set forth in claim 1.

9. Plasticised nitrocellulose in the form of semi-chips with an apparent specific gravity of from about 0.13 to about 0.34 and consisting of nitrocellulose fibers gelatinized by a plasticiser and agglomerated into friable grains capable of passing through a 3 mm mesh sieve, which are free of any residual solvent, free of protective colloids and do not contain fine dust.

* * * * *